(12) United States Patent
Yin et al.

(10) Patent No.: US 9,466,147 B2
(45) Date of Patent: Oct. 11, 2016

(54) THREE-DIMENSIONAL PROJECTION BINDING POINT RENDERING METHOD AND DEVICE

(71) Applicant: TENCENT TECHNOLOGY (SHENZHEN) COMPANY LIMITED, Shenzhen, Guangdong (CN)

(72) Inventors: Guanqiao Yin, Shenzhen, Guangdong (CN); Qi Wang, Shenzhen, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 239 days.

(21) Appl. No.: 14/460,240

(22) Filed: Aug. 14, 2014

(65) Prior Publication Data

US 2014/0362083 A1    Dec. 11, 2014

Related U.S. Application Data

(63) Continuation of application No. PCT/CN2013/071435, filed on Feb. 6, 2013.

(30) Foreign Application Priority Data

Feb. 15, 2012   (CN) .......................... 2012 1 0033599

(51) Int. Cl.
*G06T 15/20* (2011.01)
*G06T 13/40* (2011.01)
*G06T 13/80* (2011.01)

(52) U.S. Cl.
CPC ............... *G06T 15/20* (2013.01); *G06T 13/40* (2013.01); *G06T 13/80* (2013.01)

(58) Field of Classification Search
CPC ....... G06T 13/80; G06T 13/40; G06T 13/20; G06T 11/60; G06T 19/006; G06T 2200/04; G06T 2210/44; G06T 7/20; G06T 11/001; G06T 15/04; G06T 17/00; G06T 1/0007; G06T 2213/00; G06T 2213/08; G06T 3/60; G06T 7/2046; G06T 11/00; G06T 13/00; G06T 13/205; G06T 2215/16; G06T 7/0051; G06T 7/2033; G06T 7/408; A63F 13/12; A63F 13/335; A63F 13/35; A63F 13/358; A63F 2300/407; A63F 2300/552; A63F 13/355; A63F 13/792; A63F 2300/402; A63F 9/24; A63F 13/10; A63F 13/40; A63F 2300/535; A63F 2300/53
See application file for complete search history.

(56) References Cited

U.S. PATENT DOCUMENTS 5,319,744 A * 6/1994 Kelly .................. G06T 3/00
345/427

(Continued)

FOREIGN PATENT DOCUMENTS

| CN | 1282052 | 1/2001 |
|----|---------|--------|
| CN | 101350107 | 1/2009 |
| CN | 101622647 | 1/2010 |

OTHER PUBLICATIONS

International Search Reportissued in corresponding International Apiiication No. PCT/CN2013/071435.

*Primary Examiner* — Sultana M Zalalee
(74) *Attorney, Agent, or Firm* — Frommer Lawrence & Haug LLP; William S. Frommer (57) ABSTRACT

Disclosed is a three-dimensional projection binding point rendering method, which comprises: obtaining a 3D coordinate of a binding point in a three-dimensional character model, and calculating a 2D coordinate of the binding point in a 2D picture which is projected in the same projection manner as the three-dimensional character model according to the 3D coordinate of the binding point; calculating a binding point coordinate for each frame of a 2D projection picture in a character animation series to obtain all binding point coordinates corresponding to the character animation series; judging all the binding point coordinates in the character animation series and modifying a binding point coordinate with position mutation; and outputting all the binding point coordinates in a textual manner to obtain a binding point information text corresponding to the character animation series. Also disclosed is a three-dimensional projection binding point rendering device.

20 Claims, 3 Drawing Sheets

(56) References Cited

U.S. PATENT DOCUMENTS

| | | | | |
|---|---|---|---|---|
| 6,970,591 B1 * | 11/2005 | Lyons | ................... | G06K 9/209 345/419 |
| 7,403,202 B1 * | 7/2008 | Nash | ................... | G06T 7/2033 345/474 |
| 8,538,736 B1 * | 9/2013 | Paquet | ................... | G06T 13/40 345/473 |
| 2003/0054882 A1 * | 3/2003 | Suzuki | ................... | G06K 9/46 463/30 |
| 2005/0020363 A1 | 1/2005 | Kawamoto et al. | | |
| 2009/0207171 A1 * | 8/2009 | Feilkas | ................. | G06T 7/0089 345/427 |
| 2009/0244098 A1 * | 10/2009 | Tateishi | ................ | G06T 3/0093 345/646 |
| 2012/0218262 A1 * | 8/2012 | Yomdin | ................. | G06T 13/80 345/419 |

\* cited by examiner

THREE-DIMENSIONAL PROJECTION BINDING POINT RENDERING METHOD AND DEVICE

This application is a continuation application of PCT Patent Application No. PCT/CN2013/071435, entitled "THREE-DIMENSIONAL PROJECTION BINDING POINT RENDERING METHOD AND DEVICE", filed on Feb. 6, 2013, which claims priority to Chinese Patent Application No. 201210033599.X, entitled "THREE-DIMENSIONAL PROJECTION BINDING POINT RENDERING METHOD AND DEVICE" and filed on Feb. 15, 2012, both of which are hereby incorporated in their entireties by reference.

FIELD OF THE INVENTION

The present disclosure relates to three-dimensional technology, and more particularly to a three-dimensional projection binding point rendering method and device.

BACKGROUND OF THE INVENTION

The vast amount of 2D character animation is needed in 2D network game. Because amount of the character animation is very large, the cost of the hand drawn is very high. The visual effect is not good enough. Recently, a popular method is that a scene and a character are created in a 3D environment by three-dimensional modeling technology firstly. The view is fixed. The character is made a few fixed pose in order. Finally, a signal static picture is manually exported. A number of the signal static pictures exported are combined into an animation series for continuous play. That will make an action animation of character.

In addition, the character animation generally includes a head, body, a cloth, a shoot, a weapon, a equipment and so on in the game. For supporting equipment replace, the color change of the hair and cloth, these elements need to be rendered independently. In another word, the 2D picture is generated from the 3D module by the computer. The 2D pictures are real-time spliced in the game. A reference point is needed for splicing two pictures. The name of the reference point is binding point. For example, the weapon binding point determines that the weapon picture will bind specific pixel position of the character body. Recently, the method for generating binding point information is same as the method for generating character animation picture. The binding point is regarded as an element to render in 3D environment. In render process, the other elements are hided. That will get a projection picture for the binding point with a black background. This projection picture is name as binding point bitmap. If the character has a number of binding points, it will render once again until obtain a binding point picture with all of the binding point. In the follow splicing picture process, the intensity data of the pixel in the binding point bitmap as a basis for judging location of the bitmap. The pixel has a highest intensity is determined as the location of the binding point.

Above process for output binding point in bitmap manner by three-dimensional projection is called three-dimensional projection binding point rendering.

In the game development process, the image of the character and feeling of the action to combat always need be modified. And all the action of the character will render again and again. The game always includes a lot of character, such as 8 leading role. Each leading role includes 200 frames and 5 surfaces. Each character has 200*5=1000 pieces of signal frame action picture. The signal frame action pictures are all rendered. In total game, there are 1000*8=8000 pieces of signal frame action picture need to be rendered for the leading role alone. If each signal frame action picture only corresponds to 5 binding point bitmap, the number of the need binding point bitmap will reach 8000*5=40000. These work need to be done manually. That is very tedious. If the character animation is modified, the re-modify work will consume take a long time.

On the other hand, the binding point information output is realized by a ball binding point of a 3D module projecting on a plane surface to generate a 2D image. The binding point projected is not only a pixel, but a number of pixels. A few pixels may have same intensity. When the picture is spliced by reading binding point, the real binding point is hard to be judged from these pixels. The binding equipment or other elements may jitter in the spliced picture. That means the binding point position is incorrect. The typical method for solving this problem is that the jitter binding point bitmap is modified manually though PS method. The amount of the binding point bitmap is very large. The modification work is very hard.

Anyway, the binding point information in bitmap manner is generated by typical three-dimensional projection binding point rendering is very large. The data is hard to be modified and maintained. In the follow step for splicing picture, the location of the binding point is easily misjudged. That will generate a phenomenon of binding point jitter.

DISCLOSURE OF THE INVENTION

A method and a device for three-dimensional projection binding point rendering are provide in an exemplary of present disclosure. The method and the device can reduce the data amount of generated binding point information, are easily modified and maintained, and are not easy to generate a phenomenon of binding point jitter caused by incorrect judgment of a binding point position.

A method for three-dimensional projection binding point rendering includes:

obtaining a 3D coordinate of a binding point on a three-dimensional character model, and calculating a 2D coordinate of the binding point in a 2D picture which is projected in the same projection manner as the three-dimensional character model according to the 3D coordinate of the binding point;

calculating a binding point coordinate for each frame of a 2D projection picture in a character animation series to obtain all binding point coordinates corresponding to the character animation series;

judging the correct position of all the binding point coordinates in the character animation series and modifying a binding point coordinate with incorrect position mutation; and, outputting all the binding point coordinates in a textual manner to obtain a binding point information text corresponding to the character animation series.

A three-dimensional projection binding point rendering device includes:

a calculating coordinate module, configured to obtain a 3D coordinate of a binding point on a three-dimensional character model, and calculate a 2D coordinate of the binding point in a 2D picture which is projected in the same projection manner as the three-dimensional character model according to the 3D coordinate of the binding point, and calculate a binding point coordinate for each frame of a 2D projection picture in a character animation series to obtain all binding point coordinates corresponding to the character animation series;

a jitter elimination module, configured to judge all the binding point coordinates in the character animation series and modifying a binding point coordinate with position mutation;

information output module, configured to output all the binding point coordinates in a textual manner to obtain a binding point information text corresponding to the character animation series.

One non-transitory computer-readable storage medium includes an executable program configured to execute the above methods.

In the embodiments of present disclosure, position information of a 3D binding point in 2D picture is calculated by the method and the device for three-dimensional projection binding point rendering. Binding point information is output in a textual manner. Thus, the all character animation doesn't need to be rendered into a hanging point bitmap. Therefore, the speed of the binding point information output is very fast. The order of magnitude of the time for outputting all binding point information is in seconds. The typical method for outputting all binding point bitmap will spend hours or days. The typical method needs to modify the binding point information manually for avoiding jitter after all binding point information output. In the embodiments of present, when the binding point information is outputted in a textual manner, the value of the binding point coordinate is automatically judged and modified. The binding point coordinate is judged and modified might jitter. That greatly reduces the difficulty and intensity by labor modification and maintain.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Further description of present disclosure will be illustrated clearly and completely, which combined with embodiments in drawings and detailed embodiments. Obviously, the embodiments here are not all embodiments but only part of embodiments of present disclosure. Based on the embodiments of present disclosure, under premise of without paying out creative work, other embodiments obtained by the person having ordinary skill in the art are considered to encompass within the scope of the present invention.

In the typical technology, because binding point information is stored in the binding point bitmap, the binding point bitmap must be manually exported to get the binding point information. In the embodiment of present disclosure, the manner of outputting the binding point information is no longer manually export the binding point bitmap as typical. The manner of present disclosure is that the exact value of the location of the binding point is calculated basing on three-dimensional projection and binding point information text in a textual manner is exported. So the numerous about manual adjustment and output is avoided. The method also improves the output efficiency. In the embodiment of present disclosure, the binding point information is a 2D coordinate. At the next step of reading the binding point information and splicing the pictures according to the binding point coordinate, the location of the binding point is determined accurately and rapidly. That will avoid reading binding point bitmap cumbersomely and inaccurately as typical method. The problem of binding point jitter is fixed.

Figure 1:
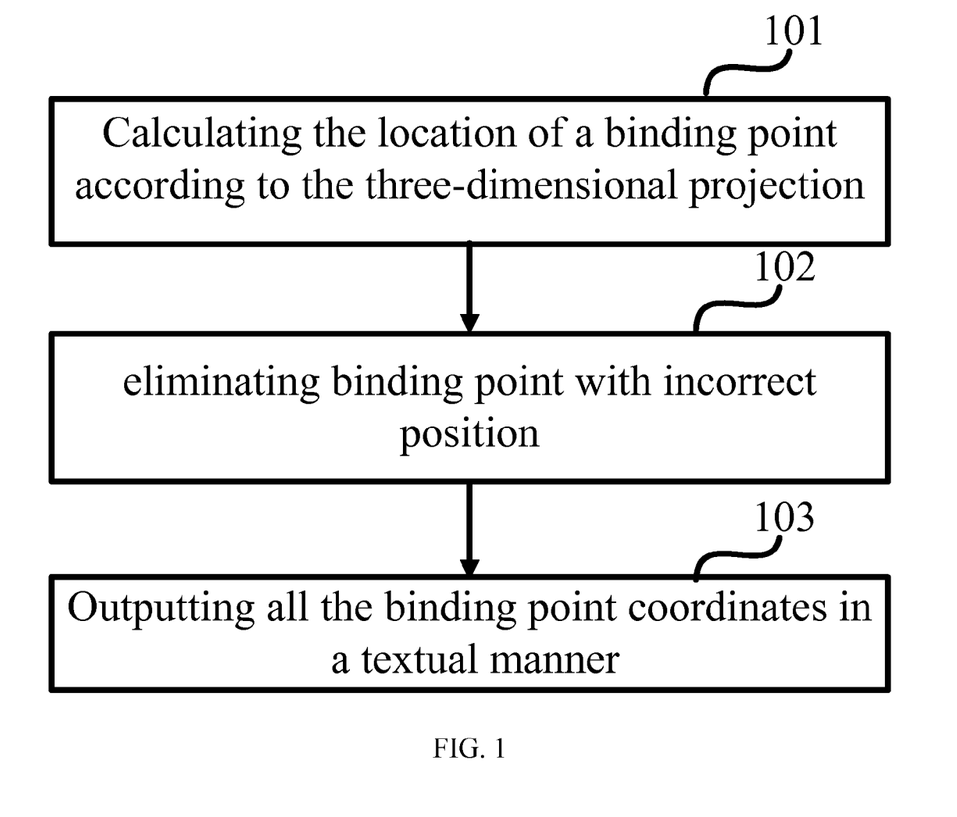
FIG. 1 is a flow chart of a method for a three-dimensional projection binding point rendering according to an embodiment of present disclosure.

Referring to FIG. 1, FIG. 1 is a flow chart of a method for a three-dimensional projection binding point rendering according to an embodiment of present disclosure. The method includes the steps as the follows.

Step S101, calculating the location of a binding point according to the three-dimensional projection.

In the step, the location of a binding point is got by calculating manner. A 2D projection coordinate for the 2D projection picture of each frame of 3D character is got according to the 3D coordinate of the binding point on a three-dimensional character model.

Figure 4:
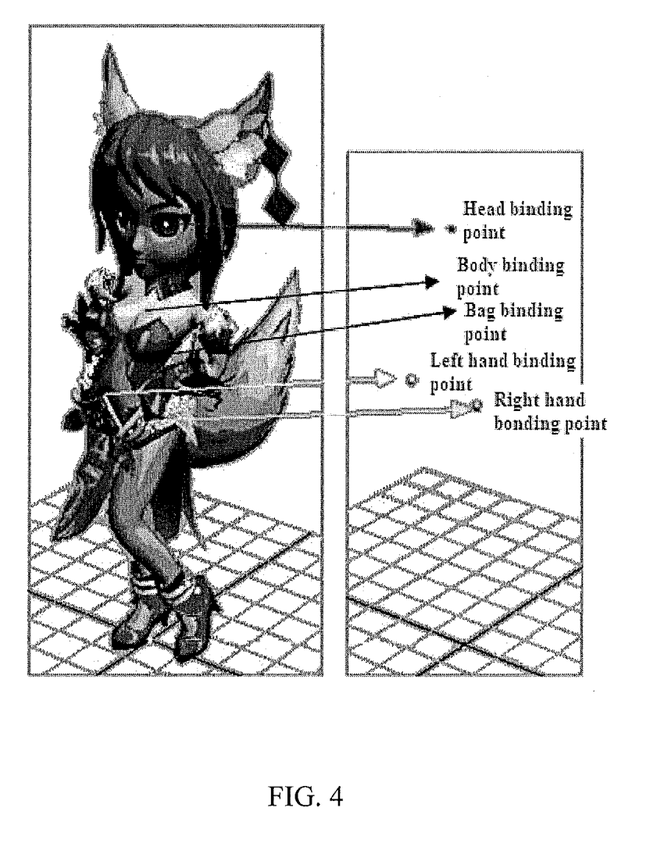
FIG. 4 is a schematic diagram of a binding point according to an embodiment of present disclosure.

The above step can be completed by the built-in script of three-dimensional modeling software, like as 3DSMax, in the actual calculating process. For example, a 3D coordinate of a binding point on a three-dimensional character model is obtained firstly. A 2D coordinate projected by the three-dimensional coordinate is calculated according to the three-dimensional coordinate. The projection manner of the 3D coordinate is same as the 2D projection manner of the three-dimensional character model. If there are a number of binding points, the name of the different binding point of the 3D character model is determined. For example, 5 binding points are design in a three-dimensional character model for splicing picture. Referring to FIG. 4, the 5 binding points includes a body, a left hand, a right hand, a bag, and a helmet. The name of the binding points is determined firstly. The name is such like body binding point $body, left hand binding point $left, a right hand binding point $right, a bag binding point $bag, and a head binding point $head. The 2D coordinate of each binding point is calculated according to 2D projection coordinate calculation method for a signal binding point, and obtaining the 2D coordinate of all the binding points with different name in a 2D picture.

Step S102, eliminating binding point with incorrect position.

After obtaining 2D coordinate of all binding points, the 2D coordinate of the binding point in a character animation series is judged. The binding point coordinate with position mutation is modified. The specific method includes follow steps.

If the variability between a binding point coordinate corresponding to a 2D projection picture of the next frame relative to the current frame and a binding point coordinate corresponding to a 2D projection picture of the previous frame relative to the current frame is in a preset range. The x and y are both integer. The preset range can be changed base on the actual projection situation. If the deviation of the x coordinate or y coordinate is 1, the binding point coordinate of the current frame picture is set equal to the binding point coordinate of the previous picture. The changed binding point coordinate of the normal act frame has a great deviation. If the deviation is little, the deviation is ignored. If a little deviation is considered, the change of the frame is abnormal and cause jump of the frame.

Step S103, outputting all the binding point coordinates in a textual manner.

Each character animation series output a binding point information text. The binding point information text records the binding point coordinate information of all binding point of the character. The different binding points are distinguished by different binding point names. The binding point having a same name each frame of a 2D projection picture in a character animation series corresponding to a same binding point coordinate. At the next step of reading the binding point information and splicing the pictures according to the binding point coordinate of each 2D projection picture in a character animation series. In the typical method, each 2D projection picture of the character will output a bitmap; even each character has one binding point. The amount of the data is large. The number of the file is very large. According to an embodiment of present disclosure, however large of the number of the binding point, each character animation series only output a binding point information text. The speed of the output increase, the amount of the data of the binding point is significantly reduced.

Figure 2:
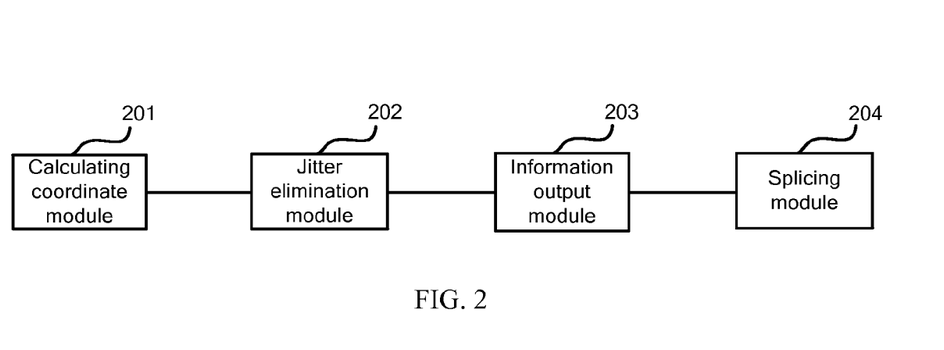
FIG. 2 is a schematic diagram of a device for a three-dimensional projection binding point rendering according to an embodiment of present disclosure.

Referring to FIG. 2, the three-dimensional projection binding point rendering device are shown. The device includes a calculating coordinate module 201, a jitter elimination module 202, and an information output module 203. The calculating coordinate module 201 obtains a 3D coordinate of a binding point on a three-dimensional character model, and calculating a 2D coordinate of the binding point in a 2D picture which is projected in the same projection manner as the three-dimensional character model according to the 3D coordinate of the binding point, and calculating a binding point coordinate for each frame of a 2D projection picture in a character animation series to obtain all binding point coordinates corresponding to the character animation series.

The jitter elimination module 202 judges all the binding point coordinates in the character animation series and modifying a binding point coordinate with position mutation The information output module 203 outputs all the binding point coordinates in a textual manner to obtain a binding point information text corresponding to the character animation series.

Figure 3:
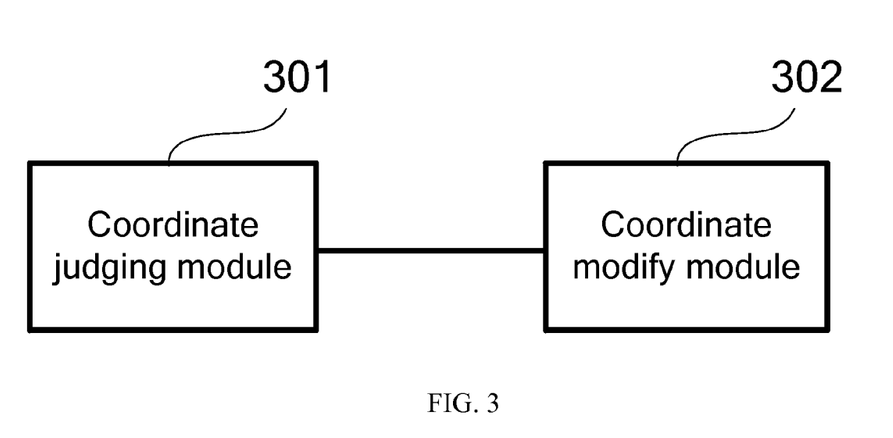
FIG. 3 is a schematic diagram of a jitter elimination module according to an embodiment of present disclosure.

Referring to FIG. 3, the jitter elimination module 202 is shown. The jitter elimination module 202 includes a coordinate judging module 301 and a coordinate modify module 302.

The coordinate judging module 301 judges whether the binding point coordinate corresponding to a next frame 2D projection picture of the current frame is set equal to the binding point coordinate corresponding to a 2D projection picture of the previous picture.

The coordinate modify module 302 sets the binding point coordinate corresponding to a 2D projection of the current frame picture equal to the binding point coordinate corresponding to a 2D projection of the previous picture, if the variability between a binding point coordinate corresponding to a 2D projection picture of the next frame relative to the current frame and a binding point coordinate corresponding to a 2D projection picture of the previous frame relative to the current frame in a preset range. The setting of the preset range can refer to the method embodiment.

The binding point information text output from the information output module 203 includes the binding point coordinate of all binding points for each frame of a 2D projection picture in a character animation series. Different binding points are distinguished by different binding point names. The binding point having a same name each frame of a character projection static picture in a character animation series corresponding to a same binding point coordinate.

Referring to FIG. 2, FIG. 2 is a schematic diagram of a device for three-dimensional projection binding point rendering according to another embodiment of present disclosure. The device includes a splicing module 204. The splicing module 204 obtains the binding point coordinate of the binding point in each frame of a 2D projection picture in a character animation series by reading binding point information text, and splicing the pictures according to the binding point coordinate.

In the embodiments of present disclosure, position information of a 3D binding point in 2D picture is calculated by the method and the device for three-dimensional projection binding point rendering. Binding point information is output in a textual manner. Thus, the all character animation doesn't need to be rendered into a hanging point bitmap. Therefore, the speed of the binding point information output is very fast. The order of magnitude of the time for outputting all binding point information is in seconds. The typical method for outputting all binding point bitmap will spend hours or days. The typical method needs to modify the binding point information manually for avoiding jitter after all binding point information output. In the embodiments of present, when the binding point information is outputted in a textual manner, the value of the binding point coordinate is automatically judged and modified. The binding point coordinate is judged and modified might jitter. That greatly reduces the difficulty and intensity by labor modification and maintain. In the typical method for spicing picture, reading the binding point bitmap, obtaining binding point exact coordinate, and recognizing intensity of the pixel to obtain exact coordinate of the binding point. The manner of present disclosure, the exact coordinate of the binding point is directly obtained by reading binding point information text. The speed of spicing picture is faster; the efficiency of spicing picture is improved.

The modules described above are divided basic on a logic function. In actual application, the function of one module can be accomplished by several modules, or the functions of several modules can be accomplished by one module. In other exemplary embodiment of present disclosure, the device for three-dimensional projection binding point rendering can also include other modules. The device three-dimensional projection binding point rendering includes a calculating coordinate module, a jitter elimination module, and a information output module. The modules are connected to each other through internal bus. The functions of the calculating coordinate module, the jitter elimination module, and the information output module are mainly triggered and controlled by the calculating coordinate module, the jitter elimination module, and the information output module. However, in actually application, the functions of the modules can be accomplished by other module, or can be accomplished by several modules. For example, a function of processing of the computer processor unit (CPU) can be used, and a data transmitting function of the internal bus can be used.

The method and device can be implemented by hardware or computer readable instruction or implemented by the hardware and the computer readable instruction. The computer readable instruction can be stored in a computer readable storage medium. Herein, the storage media may be disk, computer disk (CD), read-only memory (ROM) or random access memory (RAM) etc. Or, at least part of the computer readable storage medium can be instead by a detailed hardware, such as a field programmable gate array (FPGA) or an application specific integrated circuit (ASIC), or a programmable logic device (PLD) or circuit temporarily formed by software.

A computer-readable storage medium is provided in the present disclosure. The computer-readable storage medium is configured for storing instructions of implementing the above method. In detail, computer programs are stored in the computer-readable storage medium, and executed by at least one processor of the computer such as a central processing unit (CPU), micro processing unit (MPU).

In this conduction, the programs stored in the computer-readable storage medium can implement part or all of the method described above. Thus, the programs and the computer-readable storage medium server as part of the invention.

The computer-readable storage medium may include software disk, hardware disk, magneto optical disk, compact disc read only memory (CD-ROM), compact disc recordable (CD-R), compact disk rewritable (CD-R), digital video disc read only memory (DVD-ROM), digital video disc random access memory (DVD-RAM), digital video disc-rewritable (DVD-RW), digital video disc+rewritable (DVD+RW). The programs may be downloaded from a server via the commutation network.

A person having an ordinary skill in the art can realize that part or whole of the processes in the methods according to the above embodiments may be implemented by a computer instructing relevant hardware.

Further, the programs read from the computer readable storage medium are written into the storage of an extension plate of the computer. Then part or whole of the processes in the methods according to the above embodiments may be implemented by a central processor unit (CPU) of the extension plate.

The foregoing descriptions are merely exemplary embodiments of the present invention, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

What is claimed is:

1. A method for three-dimensional projection binding point rendering, comprising:
    obtaining a 3D coordinate of a binding point on a three-dimensional character model, and calculating a 2D coordinate of the binding point in a 2D picture which is projected in the same projection manner as the three-dimensional character model according to the 3D coordinate of the binding point;
    calculating a binding point coordinate for each frame of a 2D projection picture in a character animation series to obtain all binding point coordinates corresponding to the character animation series;
    judging the correct position of all the binding point coordinates in the character animation series and modifying a binding point coordinate with incorrect position; and,
    outputting all the binding point coordinates in a textual manner to obtain a binding point information text corresponding to the character animation series.

2. The method of claim 1, wherein the step of judging the correct position of all the binding point coordinates in the character animation series and modifying a binding point coordinate with incorrect position further comprising:
    wherein in the case of the variability between a binding point coordinate corresponding to a 2D projection picture of the next frame relative to the current frame and a binding point coordinate corresponding to a 2D projection picture of the previous frame relative to the current frame is in a preset range, the binding point coordinate corresponding to a 2D projection of the current frame picture is set equal to the binding point coordinate corresponding to a 2D projection of the previous picture.

3. The method of claim 2, wherein the preset range comprises: a deviation of the X coordinate or Y coordinate less than 1.

4. The method of claim 2, wherein in the case of the three-dimensional character model have a number of binding point, the step of obtaining a 3D coordinate of a binding point on a three-dimensional character model, and calculating a 2D coordinate of the binding point in a 2D picture which is projected in the same projection manner as the three-dimensional character model according to the 3D coordinate of the binding point further comprising:
    determining the name of the different binding point, calculating the 2D coordinate of each binding point according to 2D projection coordinate calculation method for a signal binding point, and obtaining the 2D coordinate of all the binding points with different name in a 2D picture.

5. The method of claim 2, after the step of outputting all the binding point coordinates in a textual manner to obtain a binding point information text corresponding to the character animation series further comprising:
    obtain the binding point coordinate of the binding point in each frame of a 2D projection picture in a character animation series by reading binding point information text, and splice the pictures according to the binding point coordinate.

6. The method of claim 1, wherein the binding point information text comprises:
    distinguishing different binding points by different binding point names for the binding point coordinate of all binding points for each frame of a 2D projection picture in a character animation series, the binding point having a same name each frame of a character projection static picture in a character animation series corresponding to a same binding point coordinate.

7. The method of claim 6, after the step of outputting all the binding point coordinates in a textual manner to obtain a binding point information text corresponding to the character animation series further comprising:
    obtain the binding point coordinate of the binding point in each frame of a 2D projection picture in a character animation series by reading binding point information text, and splicing the pictures according to the binding point coordinate.

8. The method of claim 1, after the step of outputting all the binding point coordinates in a textual manner to obtain a binding point information text corresponding to the character animation series further comprising:
  obtaining the binding point coordinate of the binding point in each frame of a 2D projection picture in a character animation series by reading binding point information text, and splicing the pictures according to the binding point coordinate.

9. A three-dimensional projection binding point rendering device, comprising:
  a calculating coordinate module, configured to obtain a 3D coordinate of a binding point on a three-dimensional character model, and calculate a 2D coordinate of the binding point in a 2D picture which is projected in the same projection manner as the three-dimensional character model according to the 3D coordinate of the binding point, and calculate a binding point coordinate for each frame of a 2D projection picture in a character animation series to obtain all binding point coordinates corresponding to the character animation series;
  a jitter elimination module, configured to judge all the binding point coordinates in the character animation series and modifying a binding point coordinate with position mutation;
  an information output module, configured to output all the binding point coordinates in a textual manner to obtain a binding point information text corresponding to the character animation series.

10. The device of claim 9, wherein the jitter elimination module further comprises:
  a coordinate judging module, configured to judge whether the binding point coordinate corresponding to a next frame 2D projection picture of the current frame is set equal to the binding point coordinate corresponding to a 2D projection picture of the previous picture;
  a coordinate modify module, configured to set the binding point coordinate corresponding to a 2D projection of the current frame picture equal to the binding point coordinate corresponding to a 2D projection of the previous picture, in the case of the variability between a binding point coordinate corresponding to a 2D projection picture of the next frame relative to the current frame and a binding point coordinate corresponding to a 2D projection picture of the previous frame relative to the current frame in a preset range.

11. The device of claim 10, wherein the three-dimensional projection binding point rendering device further comprises:
  a splicing module, configured to obtain the binding point coordinate of the binding point in each frame of a 2D projection picture in a character animation series by reading binding point information text, and splice the pictures according to the binding point coordinate.

12. The device of claim 9, wherein the binding point information text output from the information output module comprises:
  the binding point coordinate of all binding points for each frame of a 2D projection picture in a character animation series, distinguishing different binding points by different binding point names, the binding point having a same name each frame of a character projection static picture in a character animation series corresponding to a same binding point coordinate.

13. The device of claim 12, wherein the three-dimensional projection binding point rendering device further comprises:
  a splicing module, configured to obtain the binding point coordinate of the binding point in each frame of a 2D projection picture in a character animation series by reading binding point information text, and splice the pictures according to the binding point coordinate.

14. The device of claim 9, wherein the three-dimensional projection binding point rendering device further comprises:
  a splicing module, configured to obtain the binding point coordinate of the binding point in each frame of a 2D projection picture in a character animation series by reading binding point information text, and splicing the pictures according to the binding point coordinate.

15. The device of claim 9, wherein the calculating coordinate module is configured to determine the name of the different binding point, calculate the 2D coordinate of each binding point according to 2D projection coordinate calculation method for a signal binding point, in a 2D picture, and obtain the 2D coordinate of all the binding points with different name.

16. A non-transitory computer-readable storage medium comprising an executable program configured to execute the following method:
  obtaining a 3D coordinate of a binding point on a three-dimensional character model, and calculate a 2D coordinate of the binding point in a 2D picture which is projected in the same projection manner as the three-dimensional character model according to the 3D coordinate of the binding point;
  calculating a binding point coordinate for each frame of a 2D projection picture in a character animation series to obtain all binding point coordinates corresponding to the character animation series;
  judging the correct position of all the binding point coordinates in the character animation series and modifying a binding point coordinate with incorrect position; and,
  outputting all the binding point coordinates in a textual manner to obtain a binding point information text corresponding to the character animation series.

17. The non-transitory computer-readable storage medium of claim 16, wherein the step of judging the correct position of all the binding point coordinates in the character animation series and modifying a binding point coordinate with incorrect position further comprising:
  wherein in the case of the variability between a binding point coordinate corresponding to a 2D projection picture of the next frame relative to the current frame and a binding point coordinate corresponding to a 2D projection picture of the previous frame relative to the current frame is in a preset range, the binding point coordinate corresponding to a 2D projection of the current frame picture is set equal to the binding point coordinate corresponding to a 2D projection of the previous picture.

18. The non-transitory computer-readable storage medium of claim 16, after the step of outputting all the binding point coordinates in a textual manner to obtain a binding point information text corresponding to the character animation series further comprising:
  obtaining the binding point coordinate of the binding point in each frame of a 2D projection picture in a character animation series by reading binding point information text, and splicing the pictures according to the binding point coordinate.

19. The non-transitory computer-readable storage medium of claim 16, wherein the binding point information text comprises:
  distinguishing different binding points by different binding point names for the binding point coordinate of all binding points for each frame of a 2D projection picture in a character animation series, the binding point having a same name each frame of a character projection static picture in a character animation series corresponding to a same binding point coordinate.

20. The non-transitory computer-readable storage medium of claim 16, wherein in the case of the three-dimensional character model have a number of binding point, the step of obtaining a 3D coordinate of a binding point on a three-dimensional character model, and calculating a 2D coordinate of the binding point in a 2D picture which is projected in the same projection manner as the three-dimensional character model according to the 3D coordinate of the binding point further comprising:

determining the name of the different binding point, calculating the 2D coordinate of each binding point according to 2D projection coordinate calculation method for a signal binding point, and obtaining the 2D coordinate of all the binding points with different name in a 2D picture.

\* \* \* \* \*